Patented July 20, 1948

2,445,735

UNITED STATES PATENT OFFICE 2,445,735

ALKYLATED PHENOL AND PROCESS FOR PRODUCING SAME

Leland J. Kitchen, Akron, Ohio, assignor to The Firestone Tire & Rubber Company, Akron, Ohio, a corporation of Ohio No Drawing. Application March 8, 1946, Serial No. 653,175

2 Claims. (Cl. 260—624)

This invention relates to 2,6-di(alpha,alpha,gamma,gamma-tetramethylbutyl)-4-methylphenol. It includes the new compound and a preferred method of making the same. The composition has been found valuable as a nondiscoloring stabilizer or anti-oxidant for natural and synthetic rubber compositions. Its low volatility makes it preferred to compounds of lower molecular weight because it is not readily lost through volatilization from compounds containing it during processing and storage.

The new compound is obtained by alkylation of p-cresol with diisobutylene. Diisobutylene is obtained by dimerization of isobutylene. It is a mixture of two isomeric octenes; namely, 2,4,4-trimethyl-2-pentene—

and 2,4,4-trimethyl-1-pentene—

Both of these reactants yield the alpha,alpha,gamma,gamma-tetramethylbutyl group on reaction with the cresol. The reaction is preferably carried out with a boron fluoride catalyst, which is used as the ether complex. The following equation illustrates the reaction:

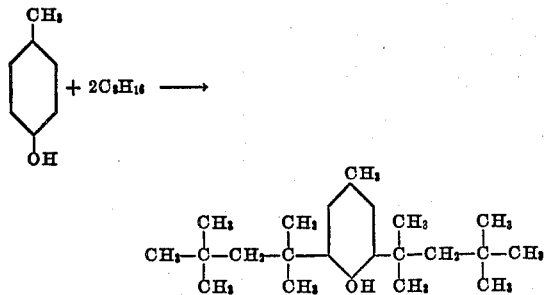

The compound has been prepared as follows: During three and a half hours 896 grams of diisobutylene were added to 214 grams of p-cresol at a temperature of 10–20° C. with vigorous stirring. Twenty-one grams of catalyst (45 per cent solution of boron trifluoride in ether) were added slowly during the first ninety minutes. The mixture was left standing at 40–45° C. for fifteen hours after the addition of the diisobutylene. It was then washed by thorough agitation with 30 per cent NaOH solution. The oily layer was analyzed by fractionation through a column packed with Raschig rings, having an efficiency of about five theoretical plates. Eighty-one grams of the 2,6-di(alpha,alpha,gamma,gamma-tetramethylbutyl)-4-methylphenol were recovered as a light yellow, highly viscous liquid boiling at 168–195° C./5 millimeters, having $n_D^{27}=1.5036$. On standing, it crystallized. After two recrystallizations from methanol, it had a melting point of 51.6–52.2° C. The recrystallized sample had a boiling point of 188° C./10 millimeters and 160° C./3 millimeters.

The compound has been found to be a nondiscoloring stabilizer for natural rubber and synthetic rubber, for example, rubber-like copolymers of butadiene and acrylonitrile.

The invention is not limited to the disclosure, but variations may be made without departing from the scope of the appended claims.

What I claim is:

1. 2,6-di(alpha,alpha,gamma,gamma-tetramethylbutyl)-4-methylphenol.

2. The method of producing 2,6-di(alpha,alpha,gamma,gamma-tetramethylbutyl)-4-methylphenol which comprises reacting two mols of diisobutylene with one mol of para-cresol in the presence of boron trifluoride as a catalyst.

LELAND J. KITCHEN.

REFERENCES CITED

The following references are of record in the file of this patent:

UNITED STATES PATENTS

| Number | Name | Date |
|--------|------|------|
| 2,189,805 | Kyrides | Feb. 13, 1940 |
| 2,265,582 | Stevens | Dec. 9, 1941 |